No. 882,927. PATENTED MAR. 24, 1908.
T. R. BROWN.
RAILWAY PASSENGER CAR.
APPLICATION FILED JULY 6, 1905.
8 SHEETS—SHEET 1.
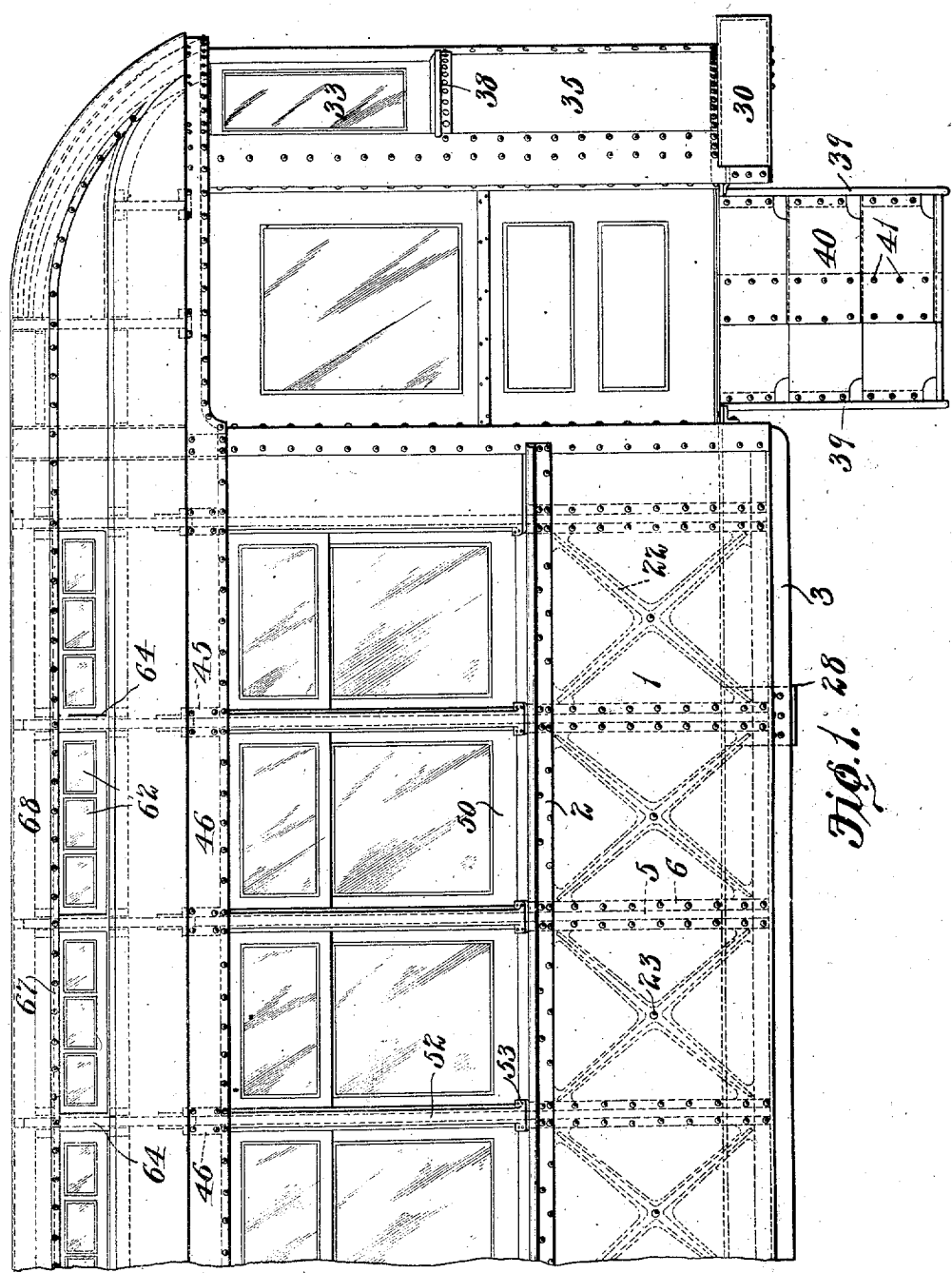
Witnesses:
Geo. R. Ladson
Nells L. Chisel
Inventor
Thomas R. Brown.
By Bakewell & Cornwall attys.

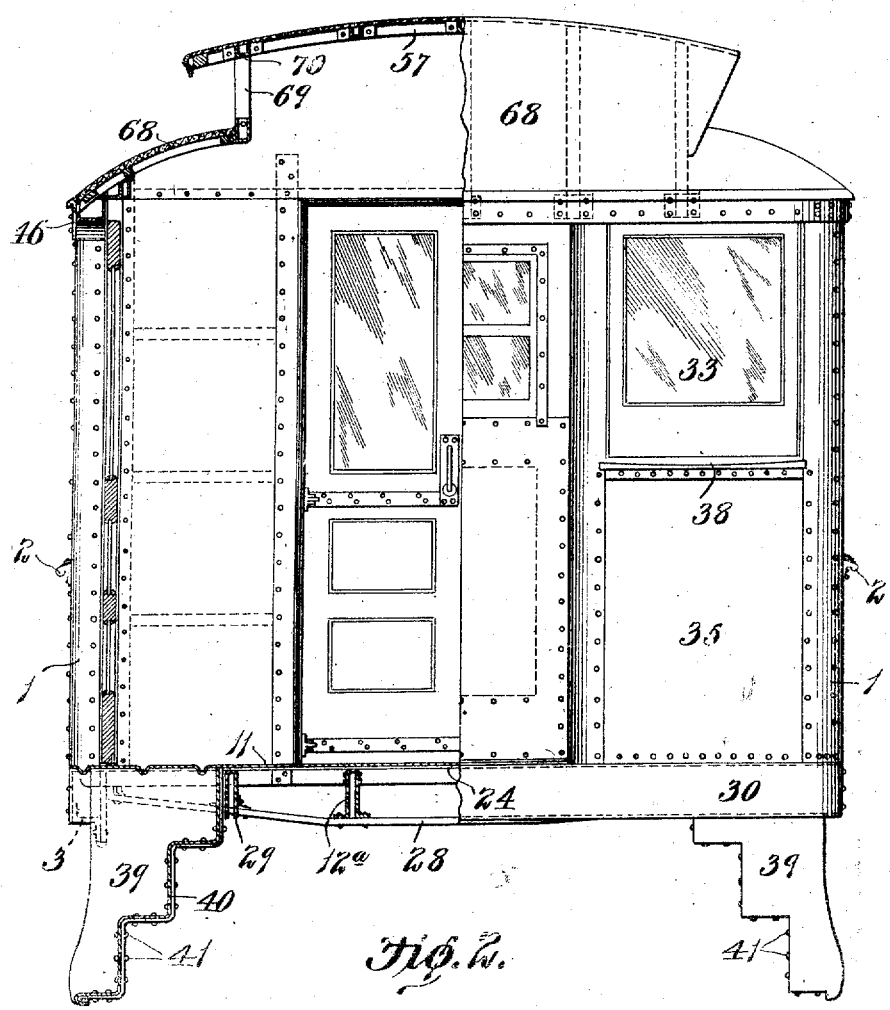

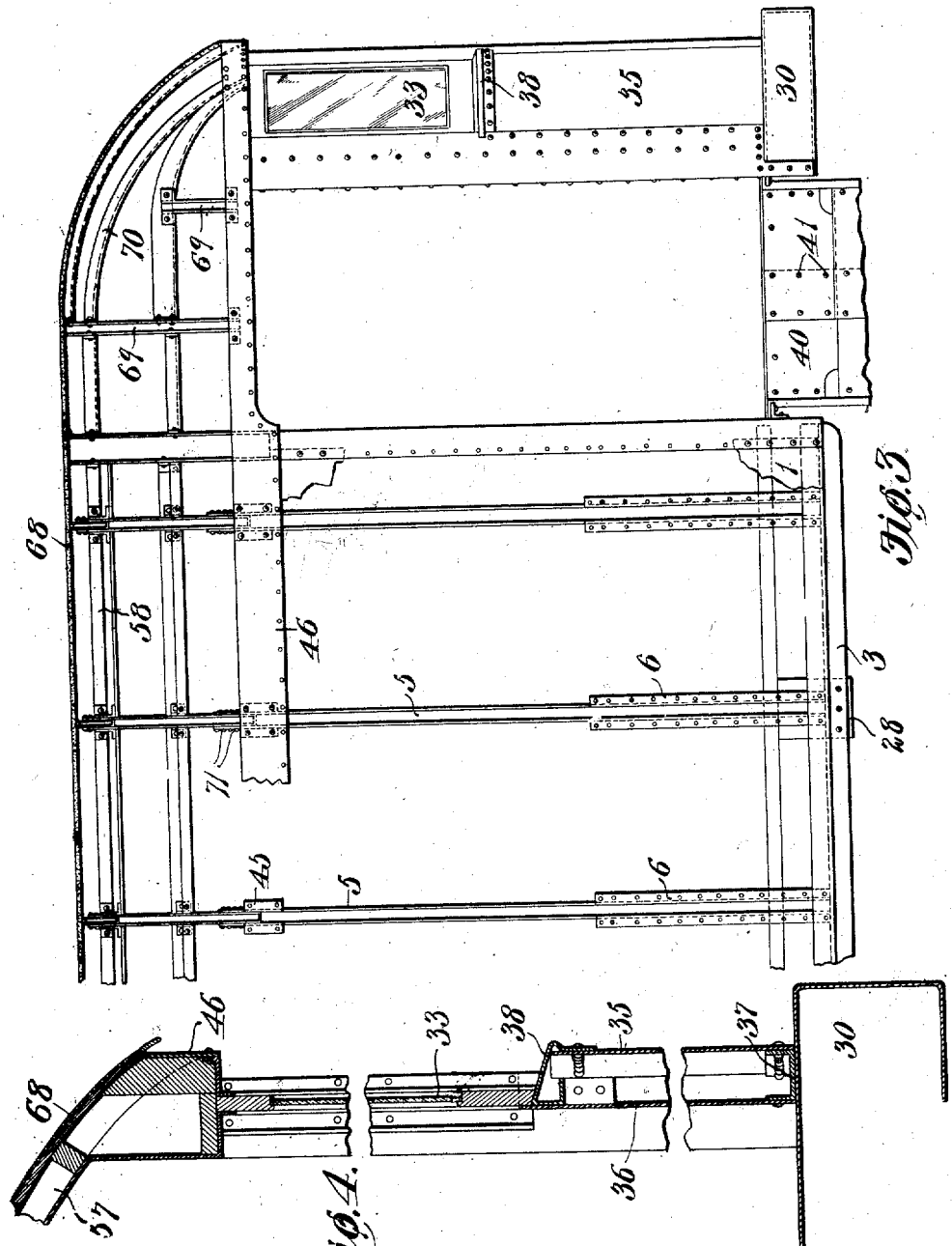

No. 882,927. PATENTED MAR. 24, 1908.
T. R. BROWN.
RAILWAY PASSENGER CAR.
APPLICATION FILED JULY 6, 1905.
8 SHEETS—SHEET 4.
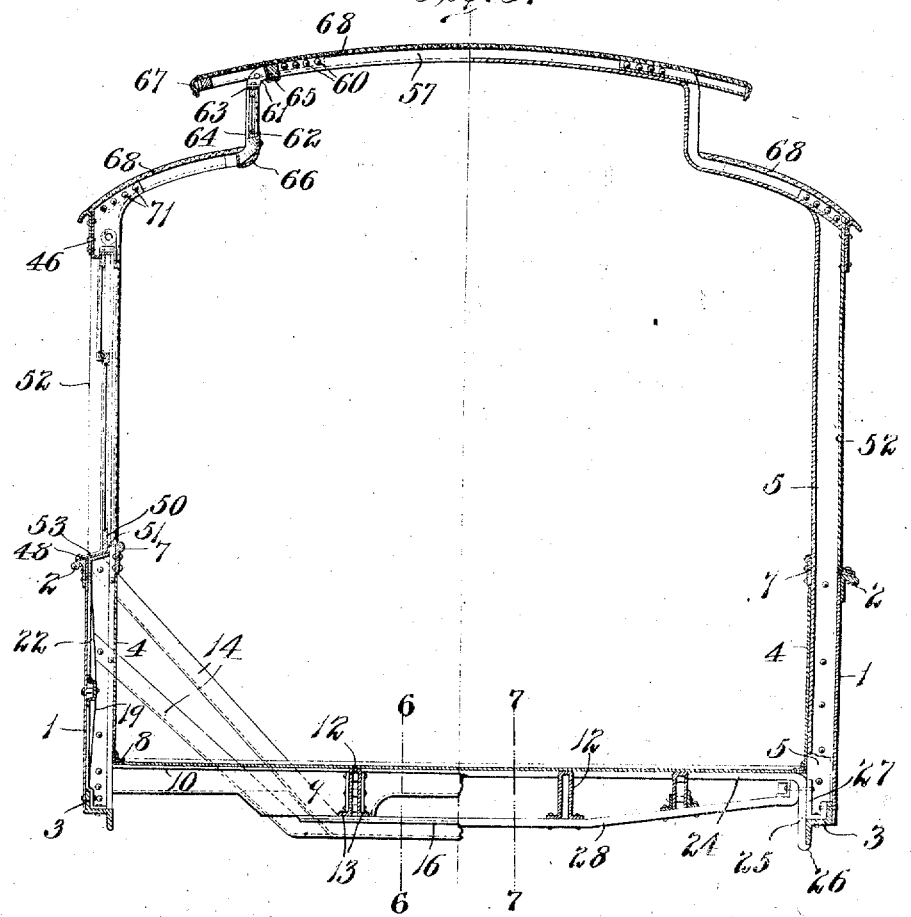
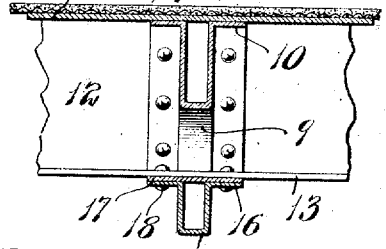
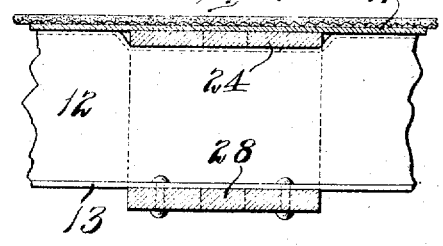
Witnesses:
Geo. R. Ladson
Wells L. Church
Inventor,
Thomas R. Brown.
By Bakewell & Cornwall
Att'ys.

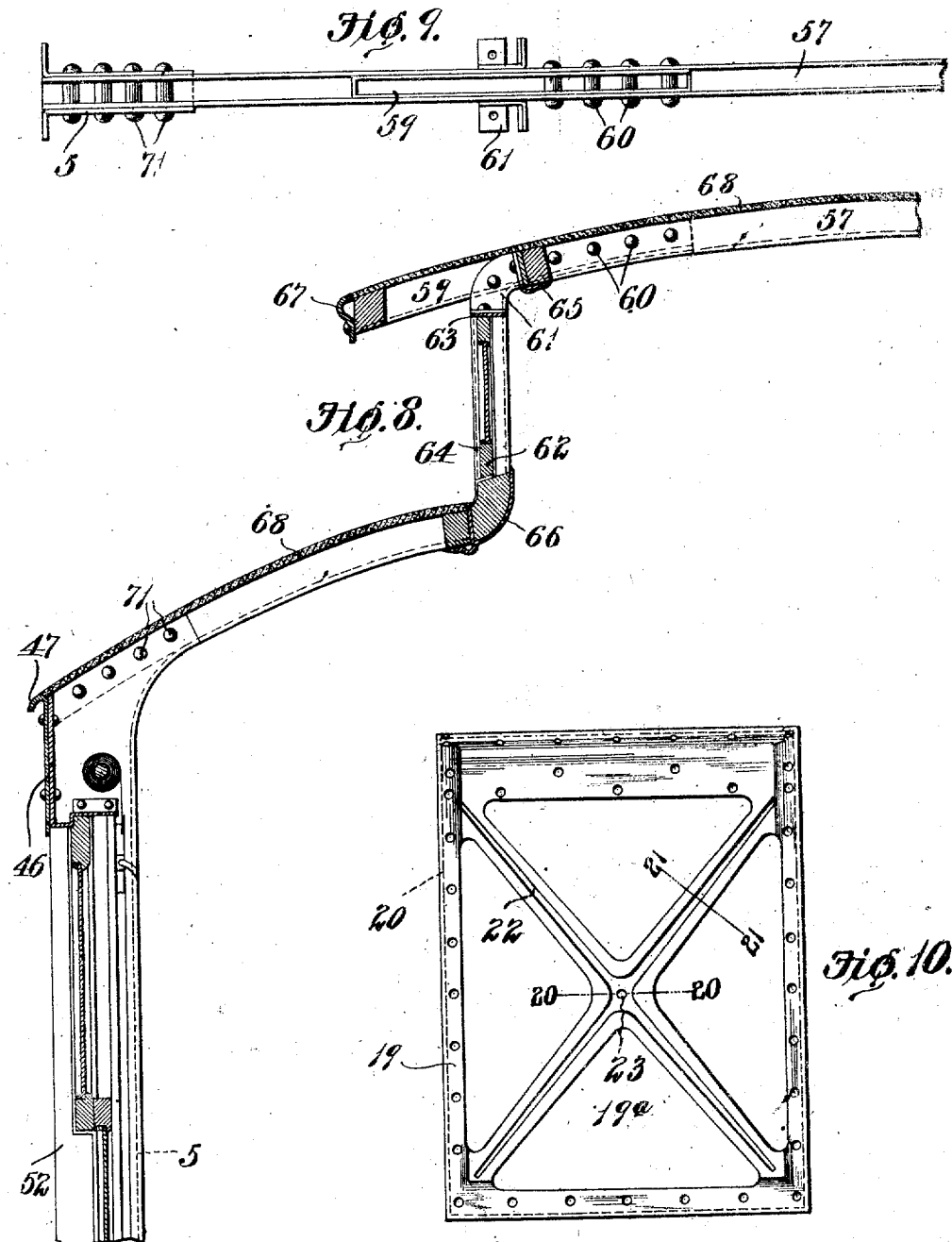

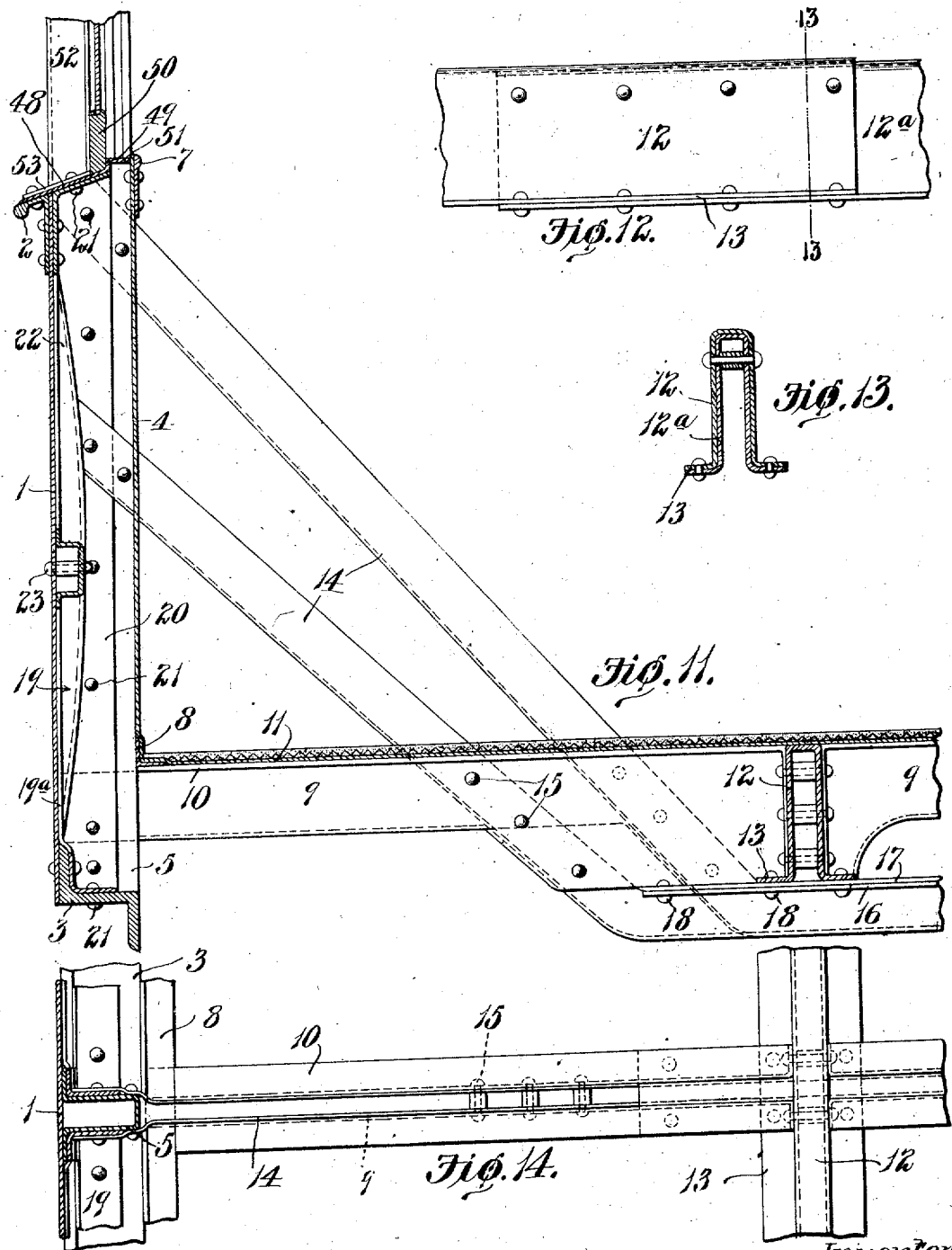

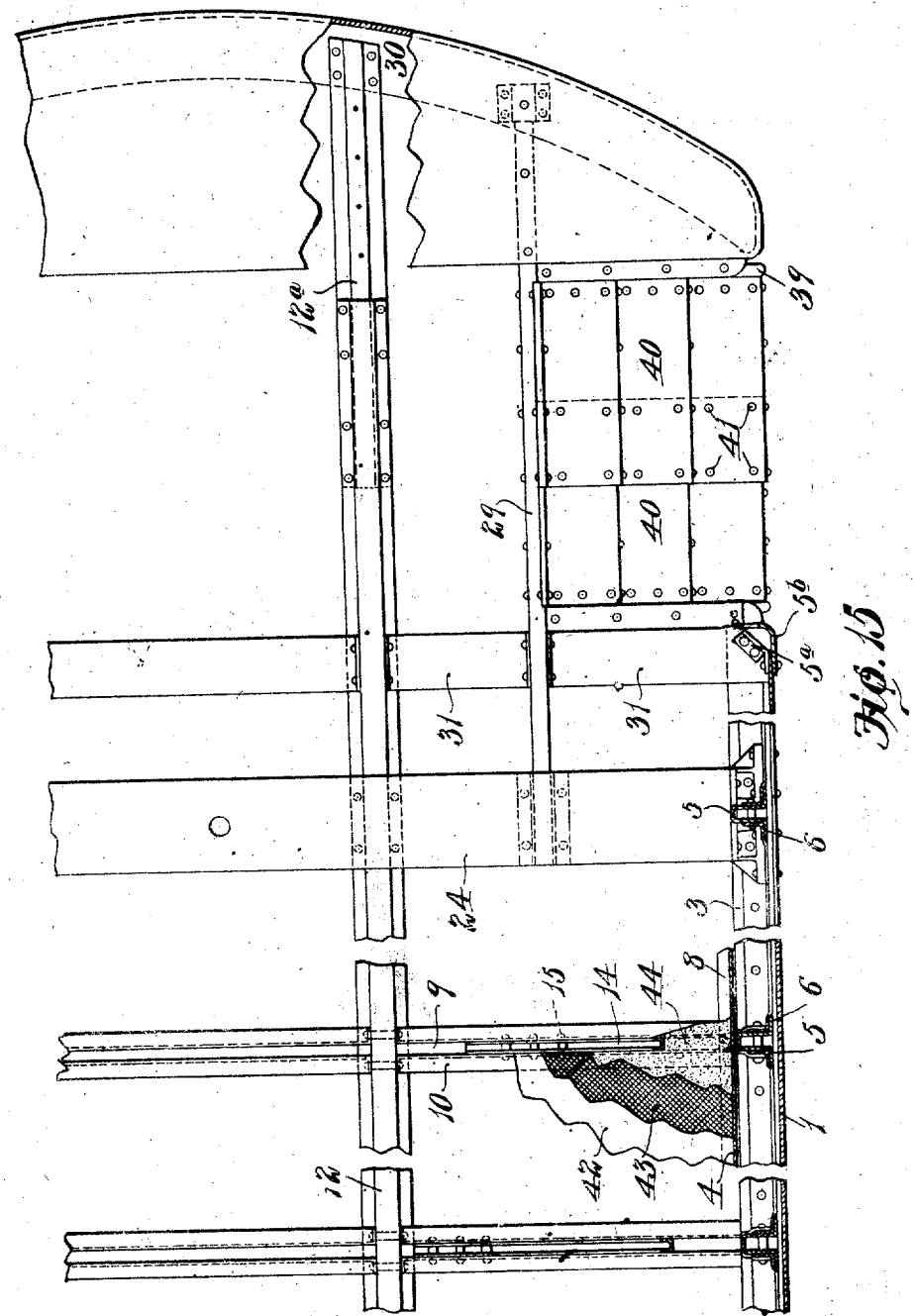

No. 882,927.  
PATENTED MAR. 24, 1908.  
T. R. BROWN.  
RAILWAY PASSENGER CAR.  
APPLICATION FILED JULY 6, 1905.  
8 SHEETS—SHEET 8.
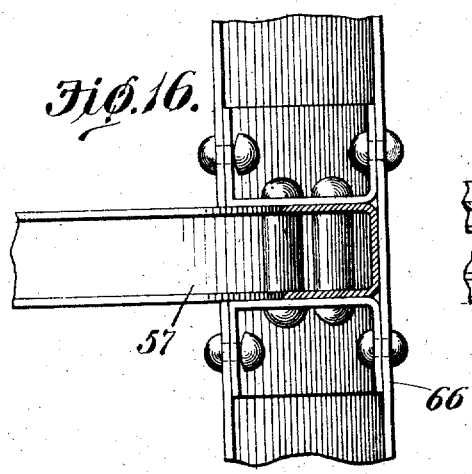
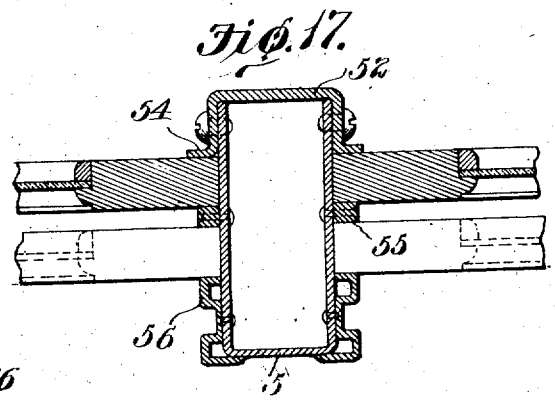
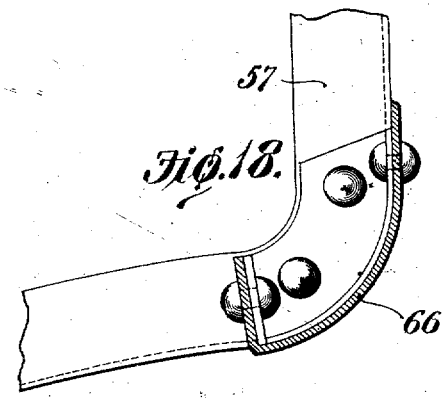
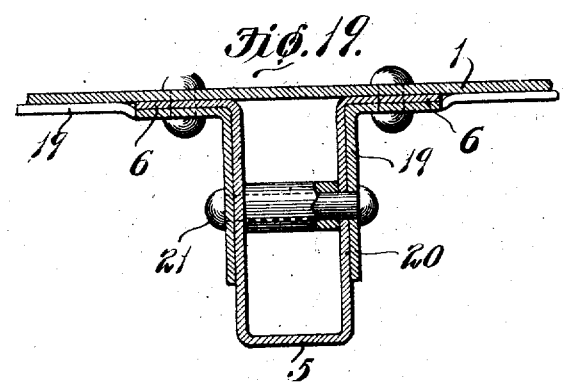
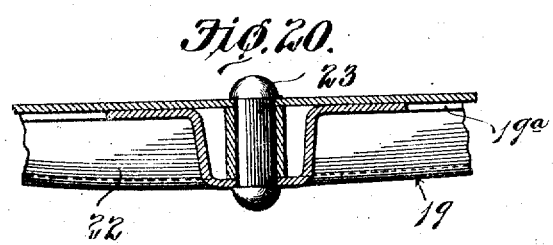
Witnesses:  
Edgar T. Farmer  
Wells L. Church  
Inventor  
Thomas R. Brown  
By Bakewell & Cornwall  
attys

UNITED STATES PATENT OFFICE.

THOMAS R. BROWN, OF NEW YORK, N. Y., ASSIGNOR TO AMERICAN CAR & FOUNDRY COMPANY, OF ST. LOUIS, MISSOURI, A CORPORATION OF NEW JERSEY.

RAILWAY PASSENGER-CAR.

No. 882,927.   Specification of Letters Patent.   Patented March 24, 1908.

Application filed July 6, 1905. Serial No. 268,461.

*To all whom it may concern:*

Be it known that I, THOMAS R. BROWN, a citizen of the United States, residing at New York, N. Y., have invented a certain new and useful Improvement in Railway Passenger-Cars, of which the following is a full, clear, and exact description, such as will enable others skilled in the art to which it appertains to make and use the same, reference being had to the accompanying drawings, forming part of this specification, in which—

Figure 1 is a side elevation of a portion of a car embodying the features of my invention; Fig. 2 is an end view of said car, the righthand half of which shows the front wall of the vestibule in elevation, and the lefthand half of which shows the end wall of the car body; Fig. 3 is a side elevation showing a portion of the framing of the car; Fig. 4 is a vertical cross sectional view taken through the front wall of the vestibule; Fig. 5 is a cross sectional view of the car; Fig. 6 is an enlarged sectional view taken on the line 6—6 of Fig. 5; Fig. 7 is an enlarged sectional view taken on the line 7—7 of Fig. 5; Fig. 8 is an enlarged detail cross sectional view showing a portion of the roof framing; Fig. 9 is a plan view of one of the roof carlines; Fig. 10 shows one of the diaphragms which are used to stiffen the side trusses; Fig. 11 is an enlarged detail cross sectional view showing the construction of the side trusses and also the floor framing; Fig. 12 is a detail view of one of the center sills; Fig. 13 is a sectional view taken on the line 13—13 of Fig. 12; Fig. 14 is a top plan view showing one of the floor beams and also one of the diagonal braces and the manner in which it is connected to the side post; Fig. 15 is an enlarged top plan view showing a portion of the underframing of the car; Fig. 16 is a detail view of a portion of the roof framing, this figure being a top plan view of the parts shown in Fig. 18; Fig. 17 is a detail cross sectional view showing the way in which the windows for the sides of the car are secured in position; Fig. 18 is a detail view showing a portion of one of the roof carlines in side elevation; Fig. 19 is an enlarged cross sectional view taken through one of the vertical side posts at a point below the belt rail and shows the manner in which the outside sheathing plate and the strengthening diaphragms are secured to said post; Fig. 20 is an enlarged cross sectional view taken on the line 20—20 of Fig. 10 showing the outside sheathing plate and the manner of connecting it to the middle portion of one of the diaphragms; and Fig. 21 is an enlarged sectional view taken on the line 21—21 of Fig. 10.

This invention relates to passenger cars, and particularly to that type which are of steel construction.

The main object of my invention is to provide a steel passenger car of minimum weight and which is strong and rigid.

Another object of my invention is to provide a steel passenger car which is constructed principally of commercial shapes, these shapes being preferably of cold drawn steel, so that it can be manufactured at a low cost.

Other desirable features of my car will be hereinafter pointed out.

The car herein illustrated which represents the preferred form of my invention, is provided with side walls, the lower portions of which are trusses or girders. Each of these side trusses is preferably composed of a plate girder extending from end to end of the car, vertically disposed side posts secured to the plate girder, and a plate or plates extending longitudinally of the car parallel to said plate girder and connected to the vertically disposed side posts. The cross bearers or beams which support the floor of the car, extend from side to side of the car and are connected to the lower edge portions of the side trusses. Preferably, said cross beams consist of approximately channel-shaped members arranged with their legs projecting upwardly, the upper edges of said legs being flanged laterally so as to provide an extended bearing surface for the floor plates of the car. Diagonal braces or compression members, preferably channel-shaped in cross section, are arranged at each side of the car and are connected at their outer ends to the side trusses and at their inner ends to the cross bearers or floor beams, the lower ends of these diagonal braces being arranged between the upwardly projecting legs of the floor beams, rivets or other suitable fastening devices extending through the vertically disposed legs of said members to secure them together.

The roof framing comprises continuous carlines that are approximately channel-shape in cross section, and the end portions of these carlines are in telescopic engagement with the vertically disposed side posts which are also channel-shaped, said side posts being provided with laterally projecting flanges to which one of the members of the side trusses are connected.

Referring to the drawings, 1 designates the web of the plate girder which forms one member of the side truss at each side of the car, this web being either a continuous plate extending from end to end of the car, or composed of a plurality of short plates. At the upper edge of this web is a compression member herein shown as a bulb angle 2 that forms the belt rail of the car, and at the lower edge of this web is a tension member 3. The tension member herein shown consists of a Z-bar but it will, of course, be understood that other shapes or simply a flat bar could be used.

Extending parallel to the web 1 of the plate girder is a plate 4 of comparatively light weight, and interposed between said plate 4 and the web 1 are vertically disposed side posts 5 which are preferably channel shape in cross section and provided with laterally projecting flanges 6 through which fastening devices extend to connect the web 1 to said posts, the plate 4 being connected to the webs of said side posts. The plate 4 is provided along its upper edge with a continuous beaded bar or flanged member 7, and fastened to the lower edge of said plate is a continuous angle 8, this bar and angle acting respectively as the compression and tension members of a girder in which the plate 4 forms the web. Instead of having this web consist of a single plate 4 a number of short plates could be used. While I have herein shown the heavy plate girder as forming the outside sheathing of the car body below the belt rail and the light weight plate girder as forming the inside sheathing, it will, of course, be obvious that these two girders could be transposed so that the heavy girder formed the inside sheathing, such a construction being the mechanical equivalent of the preferred form of my invention.

Extending transversely from side to side of the car are cross bearers or floor beams that are secured to the lower edge portions of the side trusses. The floor beams herein illustrated are made up of a number of short channel-shaped sections 9 and arranged with their legs projecting upwardly, each leg being provided with a laterally projecting flange 10 upon which the floor plates 11 rest so that the floor beams are substantially U-shape in cross section. The middle section 9 of each floor beam is provided with end flanges that are connected to the longitudinally extending center sills 12, and the end sections of the floor beams are connected to said center sills and to the vertically disposed side posts which form part of the side trusses of the car, the inner ends of said sections 9 being provided with flanges, as shown in Fig. 11, through which pass the rivets that secure the middle sections of the floor beams to the center sills. Instead of using continuous center sills the floor beams could be continuous and the center sills made up of short sections interposed between the floor beams.

As shown in Fig. 11, the center sills 12 are channel shape in cross section arranged with their legs projecting downwardly, and each leg is provided with a laterally projecting flange 13 so that the center sills in cross section resemble an inverted U.

Inclined braces or compression members 14 are used at each side of the car, and said braces are connected at their outer ends to the side trusses and at their lower ends to the floor beams. These inclined braces preferably consist of channels, the legs of which are arranged between the upwardly projecting legs of the channel-shaped floor beams to which they are connected by rivets 15, a portion of the web at the outer end of each brace being removed so that the legs or side flanges of said brace can straddle the side posts, as shown in Figs. 11 and 14, the inside plates 4 of the side trusses being provided with openings through which the inclined braces pass.

In the preferred form of my invention, as shown in Fig. 11, the diagonal braces or compression member 14 consist of continuous channels that extend from side to side of the car and pass underneath the center sills so as to aid in supporting said sills, the car herein shown being so constructed that the major portion of the load is carried by the side walls of the car. When the diagonal braces are formed by continuous members that pass under the center sills, the webs of the end sections 9 of the floor beams adjacent the center sills are cut away to form openings through which said continuous braces pass. The portions of said braces 14 that are arranged under neath the center sills are provided with laterally projecting flanges 16, and a plate 17, which is connected to the flanges 13 of the center sills, is secured by rivets 18 to the flanges 16 on each diagonal brace.

The side trusses are preferably strengthened by pressed steel diaphragms 19 interposed between the two parallel plate girders and arranged between the side posts. Each of these diaphragms is preferably provided with a continuous flange 20 that is connected by rivets 21 to the legs of the channel-shaped side posts, to the horizontal web of the Z-bar 3, and to the window sill plate hereinafter described, this construction being shown in Fig. 11. One of said diaphragms is shown in detail in Fig. 10, wherein it will be seen that it is provided with diagonally extending ribs 22 that impart great strength to it, the lower portion of said diaphragm being offset inwardly, as shown in Fig. 11, to receive the upwardly projecting leg of the Z-bar 3 so that the outer face of said diaphragm will lie flush with the outer face of said leg and thus contact with the web 1 of the plate girder to which it is secured by the same rivets that connect said plate or web to the flanges 6 of the vertical side posts, see Fig. 19. The web plate may also be connected to these diaphragms by means of fastening devices 23 that pass through openings at the centers of said diaphragms, as shown in Fig. 20. These diaphragms may either be solid or they may be cut away to provide openings 19ª between the diagonal strengthening ribs so as to reduce their weight. Instead of using diaphragms of this description between the side posts the side trusses can be strengthened in various other ways.

Each body bolster of the underframe consists of a continuous compression member 24 that passes over the center sills and is bent downwardly at its outer ends to form depending extensions 25 provided with lips 26 on which the vertical legs of the Z-bars 3 rest, as shown in Fig. 5, a member 27 being secured to these depending extensions and bearing upon the webs of said Z-bars.

As shown in Fig. 7, the center sills are provided at their top sides with recesses or depressions to receive the compression member of the bolster so that the upper surface of said compression member will lie flush with the tops of the center sills. The tension member of the bolster consists of a continuous plate 28 that passes underneath the center sills and is connected at its opposite ends to the depending extensions 25 of the compression member, said plate 28 being also secured to the flanges 13 of the center sills.

Longitudinally extending platform beams 29, shown in Fig. 15, are secured at their inner ends, by means of angles, to the tension member 28 of the bolster and at their outer ends to the platform end sill 30 which is of pressed steel and channel shaped in cross section, the upper flange of the channel being quite wide so as to act as a beam or girder to resist the effects of collisions. Each end sill of the car is made up of members 31 interposed between the center sills and longitudinal floor beams 29 and between said floor beams and the Z-bars 3 that form part of the side trusses. The corner posts 5ª of the car body are connected to the end sills and have curved corner plates 5ᵇ secured thereto. As previously stated, the center sills can be continuous from the platform end sill at one end of the car to that at the other end of the car, but I prefer to form said center sills in sections, the central section 12 of which projects beyond the end sills and thus forms the main supports for the platforms, sections 12ª being secured to the ends of section 12 and also to the platform end sills, as shown in Fig. 15, these sections being telescoped and riveted together, see Figs 12 and 13.

The front wall of the vestibule below the windows 33 therein is of substantially box girder construction, as shown in Fig. 4, and consists of an outside sheathing plate 35 and an inside sheathing plate 36, both of which are secured at their lower edges to a channel 37 connected to the upper flange of the platform end sill 30. Vertical posts project upwardly from the platform end sill to support the hood or portion of the roof that extends over the platform, and the sheathing plates of the front wall of the vestibule are connected to said posts. Window sill members 38, which may be of compressed steel, are arranged between these posts, and the sheathing plates are secured to said sill members. The step hangers 39 consist of sheet metal plates that are connected to the end sill and to the platform end sill and the steps or treads are formed by two plates 40 lapped one upon the other at their inner edge portions and secured together by rivets 41, as shown in Fig. 1, the plates 40 being secured to the step hangers and also to the longitudinally extending platform beams 29, thereby producing a construction that is strong and inexpensive to manufacture.

The floor of the car is made up of metal plates 42 secured to the flanges 10 of the floor beams 9, which flanges lie in the same horizontal plane as the upper edges of the center sills so that the floor plates also bear directly on the center sills. Expanded metal or wire netting 43 is secured to the floor plates and is covered by a layer of concrete monolith or other fire and arc-proof material 44, the function of this expanded metal being to hold the fireproof material in place.

The side posts 5 are provided at their upper ends with laterally projecting flanges 45 to which the facia plate or letter-board 46 is secured, said facia plate preferably extending from end to end of the car and being provided at its upper edge with a downwardly extending hood flange 47 that forms a continuation of the lower deck of the roof, as shown in Figs. 5 and 8, and protects the outer face of the facia plate from the water that runs from the roof of the car.

A window sill plate or flasher 48 extends along the upper edge of the side trusses and is secured to the flanges at the upper edges of the diaphragms 19 and to the horizontal leg of the bulb angle 2. This sill plate is provided with a shoulder 49, as shown in Fig. 11, that contacts with the inside faces of the lower rails 50 of the window sashes, and also with a horizontally disposed portion 51 that forms an arm-rest on the inside of the car.

The portions of the side posts 5 between the belt rail and the facia plate constitute piers between the windows and are covered by pressed metal covers 52 provided at their lower ends with flanges 53 that conform to the inclination of the window sill plate and are connected thereto. Said covers 52 are provided on their longitudinal edges with laterally projecting flanges 54, as shown in Fig. 17, that form outside stops for the window sashes, the inside stops for the upper sash of each window being formed by members 55 that are secured to the side posts. The inside stops 56 for the lower sashes of the windows are connected to the side posts and are provided with guideways or grooves for the window curtains. While I have herein shown two sashes for each window it will, of course, be understood that a single sash could be used.

The roof is composed of continuous metallic carlines 57 that are channel-shaped in cross section and longitudinally extending purlins made up of short sections 58 interposed between and connected to the carlines by brackets. The overhang at each side of the upper deck of the roof is formed by members 59 that are arranged between the vertical legs of the horizontal portions of the carlines which form the upper deck frame said members 59 projecting outwardly over the lower deck, as shown in Fig. 8. These members 59 are preferably of metal, channel-shaped in cross section, and are secured to the carlines by means of rivets 60. Fastened to the outer ends of said members 59 is a continuous metal molding 67 that strengthens the overhang and also imparts a finished appearance thereto. Brackets 61 are secured to the carlines at the points where they are bent downward to form piers between the ventilators or windows 62 of the side deck, and each of said brackets is provided with two flanges, one of which has a purlin section connected thereto which frames in the upper side of the opening for the side deck window. The vertically disposed portions of the carlines which form the piers between the side deck windows are protected on their outer sides by pressed metal pier covers 64, shown in Figs. 1 and 8.

Extending longitudinally of the car at the junction of the upper deck and side deck and at the junction of the lower deck and side deck are metal moldings 65 and 66 which may be ornamented and thus form part of the interior finish of the car, these moldings acting primarily as purlins to strengthen the roof. The framing for the upper and lower decks, of course, carries the roof sheathing 68. The framing for the platform hood is composed of carlines 69 and purlins 70 of similar construction to those which form the framing for the roof proper. The roof of the car is thus formed as a single unit which can be built and then placed in position on the car body, the outer ends of the channel-shaped carlines being in telescopic engagement with the flanges or legs of the vertical side posts and being secured thereto by rivets 71, as shown in Fig. 8. While I have herein shown the carlines as being telescoped within the legs or flanges of the side posts, it should be understood that this construction is not essential as the legs or flanges of the cars could embrace or straddle the side posts.

Having thus described my invention, what I claim as new and desire to secure by Letters Patent is:

1. In a railway passenger car, plate girder sides comprising diaphragms having upper and lower flanges integral therewith, separate flanged members connected to the upper portions of said diaphragms and having flanges disposed in directions opposite to the upper flanges of the diaphragms, a flasher connected to the respective upper flanges, and a flanged bottom chord member connected to the lower flanges of the diaphragms; substantially as described.

2. In a railway passenger car, plate girder sides having top reinforcing members comprising continuous rolled members secured to the upper edges of said plate girder sides and extending from car end to car end, inwardly disposed flanges carried by the upper portions of the plate girder sides, flashers connected to the continuous rolled members and to the inwardly disposed flanges of the plate girder sides, flanges carried by the bottoms of the plate girder sides, and reinforcing flanged members connected to the bottom flanges of the plate girder sides; substantially as described.

3. In a passenger car, the combination with plate girder sides having top and bottom chords, of vertical reinforcing members comprising pressed steel post members which form piers between the windows, and pressed steel diaphragms between said posts; substantially as described.

4. In a railway passenger car, the combination with plate girder sides, vertical post members carried by said sides and framing in the window openings, and diaphragm members interposed between the post members and arranged to brace the car sides; substantially as described.

5. In a railway passenger car, the combination with plate girder sides, vertical post members carried by said sides, and framing in the windows, and diagonal bracing members interposed between said post members and formed of pressed steel; substantially as described.

6. In a metal car, the combination with plate girder sides, vertical post members carried by said sides, and diaphragms interposed between the posts and coöperating with the sides to add strength thereto; substantially as described.

7. In a railway passenger car, U-shaped center sills continuous from end sill to end sill, and a floor framing comprising transversely extending U-shaped supports provided with laterally projecting flanges which lie in a horizontal plane, said supports being formed of cold drawn steel and being connected to said center sills; substantially as described.

8. In a railway passenger car, U-shaped center sills having outwardly disposed flanges, plate girder sides, diagonally extending braces connected to the plate girder sides and having outwardly disposed flanges, said braces extending below the center sills and having their flanges secured to the flanges of said center sills; substantially as described.

9. In a railway passenger car frame, center sills of U-shape in cross section having oppositely disposed flanges at their free edges, and truss bolsters whose lower chords are connected to said oppositely disposed flanges; substantially as described.

10. In a railway car, the combination with center sill members and plate girder sides, U-shaped diagonal braces and center sill supports comprising members connected to the plate girder sides above the floor and extending downwardly beneath the center sill members, said braces having flanges connected to the center sill members; substantially as described.

11. In a railway car, the combination with center sills and plate girder sides, of U-shaped diagonal braces and center sill supports comprising continuous members extending from side to side of the car and passing beneath the center sills, U-shaped transverse floor supports between which the center sill supports pass and to which they are securely riveted; substantially as described.

12. In a railway car, the combination with center sills and plate girder sides, of U-shaped diagonal braces and center sill supports comprising continuous members extending from side to side of the car and passing beneath the center sills, and U-shaped transverse floor supports between which the center sill supports pass and to which they are securely riveted, said diagonal braces and center sill supports being provided at their upper edges with flanges, where they pass beneath the center sills, whereby said members are additionally reinforced by plates riveted to said flanges; substantially as described.

13. In a metal passenger car, the combination with center sills and plate girder sides, of U-shaped pressed steel posts carried by said sides and being continuous from the bottom member of the side to a point above the letterboard of the car frame, said U-shaped pressed steel posts having separated flanges at points along the free edges thereof; substantially as described.

14. A pressed steel post of approximately U-shape in cross section and having outwardly disposed flanges extending from the bottom of the car to a point adjacent the belt rail, and outwardly disposed flanges approximately the depth of the letterboard, said posts extending from the bottom of the car to the roof; substantially as described.

15. A railway passenger car having pressed steel continuous carlines, extensions on the carlines, and continuous pressed steel moldings connecting the terminal ends of the carline extensions; substantially as described.

16. In a railway passenger car, vertical post members of approximately U-shape in cross section and having oppositely disposed flanges, and a letterboard secured to said flanges, said post members extending upwardly beyond said letterboard; substantially as described.

17. A stiffener for railway car sides comprising an approximately rectangular diaphragm having intersecting diagonal ribs, and integral edge flanges at the top and bottom of said diaphragm; substantially as described.

18. A side stiffener for railway cars comprising a diaphragm having a pressed steel rib, an integral flange at the upper edge of said diaphragm, and an offsetted angle extension at the bottom edge of said diaphragm; substantially as described.

19. A side stiffener for railway cars comprising a diaphragm having pressed steel diagonal ribs with the metal removed between said ribs; substantially as described.

20. A side stiffener for railway cars comprising a diaphragm having diagonal pressed steel ribs with metal removed between said ribs, and inwardly bent upper and lower flanges; substantially as described.

21. A side stiffener for metal cars comprising a diaphragm having intersecting ribs pressed thereon with metal removed between said ribs, and an offsetted angle portion at the lower edge of said diaphragm; substantially as described.

22. In a railway passenger car, a body frame having continuous flanged facia plates connected to the ends of the carlines, said facia plates extending from end to end of the car; substantially as described.

23. In a railway passenger car, the combination with carlines extending from side to side and bent so as to have angles, of continuous purlins comprising pressed steel ornamented moldings forming part of the finish of the interior of the car and connected to said carlines at the angle portions thereof; substantially as described.

24. In a railway passenger car, a pressed steel end sill having a relatively wide top flange forming part of the floor of the vestibule platform and having an inturned lower flange, and inverted U-shaped center sill members having outwardly disposed flanges which are connected to the inturned flanges of the end sill; substantially as described.

25. In a railway passenger car, platform sills, center sills supporting said platform sills, floor supports, steps carried by one of said floor supports and made up of a series of plates overlapping one another, and a step frame connected to the platform sill and having said steps riveted thereto; substantially as described.

26. In a railway passenger car, the combination with roof carlines, consisting of channel irons arranged with their side webs extending upwardly, and bent to form the upper deck of the roof, of extension pieces fitting between the side webs of the carlines at the edge of the upper deck and extending beyond the bends in the carlines to form the overhang of the said upper deck; substantially as described.

27. In a railway passenger car frame, the combination with side trusses, of cross beams for the floor of the car consisting of laterally flanged channel irons arranged with their side webs extending upwardly and secured to the bottoms of the side trusses, and diagonal braces consisting of channel irons secured to the side trusses and extending down between and secured to the vertical webs of the cross beams; substantially as described.

28. A car provided with U-shaped side posts, pressed metal pier covers embracing said posts and provided at their lower ends with flanges, a sill plate extending longitudinally of the car and having the flanges of said covers connected thereto, sash stops on the side posts, and window sashes arranged between said sash stops and the inner edges of the pier covers; substantially as described.

29. A car provided with U-shaped side posts having their flanges or legs presented outwardly, pressed metal pier covers embracing the outwardly projecting legs or flanges of said posts and provided at their inner edges with laterally projecting flanges, sash stops connected to said posts, and window sashes arranged between said sash stops and the flanges at the inner edges of the pier covers; substantially as described.

30. A car provided with plate girder sides, channel-shaped floor beams connected to said plate girder sides and provided at their upper edges with laterally projecting flanges, and metallic floor plates secured to said flanges; substantially as described.

31. A car provided with plate girder sides, floor beams of approximately channel shape in cross section connected to said plate girder sides and provided with laterally projecting flanges, floor plates secured to said flanges, and diagonal braces extending from side to side of the car and having their outer ends connected to said plate girders; substantially as described.

32. A car provided with side trusses, each of which consists of a longitudinally extending plate girder, a plate extending parallel thereto, vertical side posts arranged between said plate and plate girder and connected thereto, and floor beams connected to the side trusses; substantially as described.

33. A car having a side wall which consists of a longitudinally extending plate girder, a plate extending parallel thereto, and approximately channel-shaped roof posts between said plate and plate girder and provided with laterally projecting attaching flanges; substantially as described.

34. A car having roof posts provided at their upper ends with flanges, and roof carlines consisting of approximately channel shaped members extending from side to side of the car and having their end portions in telescopic engagement with the flanges of the roof posts; substantially as described.

35. A car provided with side trusses, each of which consists of a longitudinally extending plate girder having tension and compression members, a plate extending parallel to said girder, vertical side posts arranged between said plate and plate girder and secured thereto, and floor beams supported by the lower edges of said side trusses and consisting of substantially U-shaped members provided with laterally projecting flanges to which the floor plates are connected; substantially as described.

36. A car provided with side trusses, each of which consists of a pair of parallel plate girders, vertical side posts arranged between said plate girders and connected thereto, flanged floor beams connected to said side trusses, and channel-shaped diagonal members having their outer ends secured to the side wall posts and their lower ends to the webs of the floor beams; substantially as described.

37. A car provided with side trusses, floor beams secured to said side trusses and provided at their upper edges with laterally projecting flanges, floor plates secured to said flanges, and continuous diagonal members secured to the webs of the floor beams and having their outer ends connected to the side trusses; substantially as described.

38. A car provided with roof posts, carlines extending from side to side of the car and consisting of approximately channel-shaped members provided with laterally projecting flanges, roof plates connected to said flanges, and flanges at the upper ends of the roof posts which are secured to the legs of the carlines; substantially as described.

39. A car provided with a vestibule end wall which consists of two parallel plates that are spaced away from each other, a spacing member arranged between said plates and consisting of a horizontally disposed channel to the side legs of which the lower edge portions of said plates are connected, and a platform end sill on which said channel rests; substantially as described.

40. A car having side wall posts provided at their upper ends with flanges, roof carlines embraced by the flanges on said side posts, a roof sheathing connected to said carlines, and a facia plate connected to the side posts and provided at its upper edge with a downwardly projecting flange that forms a continuation of the roof sheathing; substantially as described.

In testimony whereof, I hereunto affix my signature, in the presence of two witnesses, this 11th day of July 1905.

THOMAS R. BROWN.

Witnesses:
ALLEN E. OSTRANDER,
ROBT. G. JEFFERY.